United States Patent [19]

Langenbeck

[11] Patent Number: 5,484,237

[45] Date of Patent: Jan. 16, 1996

[54] PNEUMATIC CONVEYOR APPARATUS HAVING AIR DEFLECTORS

[76] Inventor: Keith A. Langenbeck, 4005 University Blvd., Dallas, Tex. 75205

[21] Appl. No.: 165,396

[22] Filed: Dec. 10, 1993

Related U.S. Application Data

[63] Continuation-in-part of Ser. No. 999,770, Dec. 29, 1992, Pat. No. 5,299,889.

[51] Int. Cl.[6] ................................................. B65G 51/02
[52] U.S. Cl. ................................................ 406/86; 406/88
[58] Field of Search ............................ 406/88, 86, 191, 406/194; 226/97

[56] References Cited

U.S. PATENT DOCUMENTS

| | | | |
|---|---|---|---|
| 4,732,513 | 3/1988 | Lenhart | 406/88 |
| 4,848,974 | 7/1989 | Wayt | 406/88 |
| 5,161,919 | 11/1992 | Smith et al. | 406/88 X |
| 5,222,840 | 6/1993 | Ingraham et al. | 406/88 |

*Primary Examiner*—Andrew C. Pike
*Attorney, Agent, or Firm*—W. Kirk McCord

[57] ABSTRACT

A pneumatic conveyor apparatus for conveying articles, such as empty aluminum cans and plastic bottles, includes first and second air ducts for supplying pneumatic pressure to move the articles along a predetermined path. The first and second air ducts each have a plurality of vents which direct the flow of air on the articles to move the articles along the path and to exert a lifting force on the articles as the articles are moved downstream. Guide plates extend along both sides of the predetermined path for supporting the articles in a generally upright position as the articles are moved along the path. The first and second air ducts each have a plurality of deflectors mounted therewith, which extend from the respective first and second air ducts into the predetermined path. The deflectors direct air flow upwardly and inwardly, thereby enhancing the pneumatic force urging the articles downstream. The direction of the conveyor path is changed by miter cutting the first and second air ducts at selected locations and joining the miter cut sections in end-to-end abutting relationship. The guide plates are each defined by alternating straight and curved guide plate sections, to effect the desired change in direction.

8 Claims, 8 Drawing Sheets

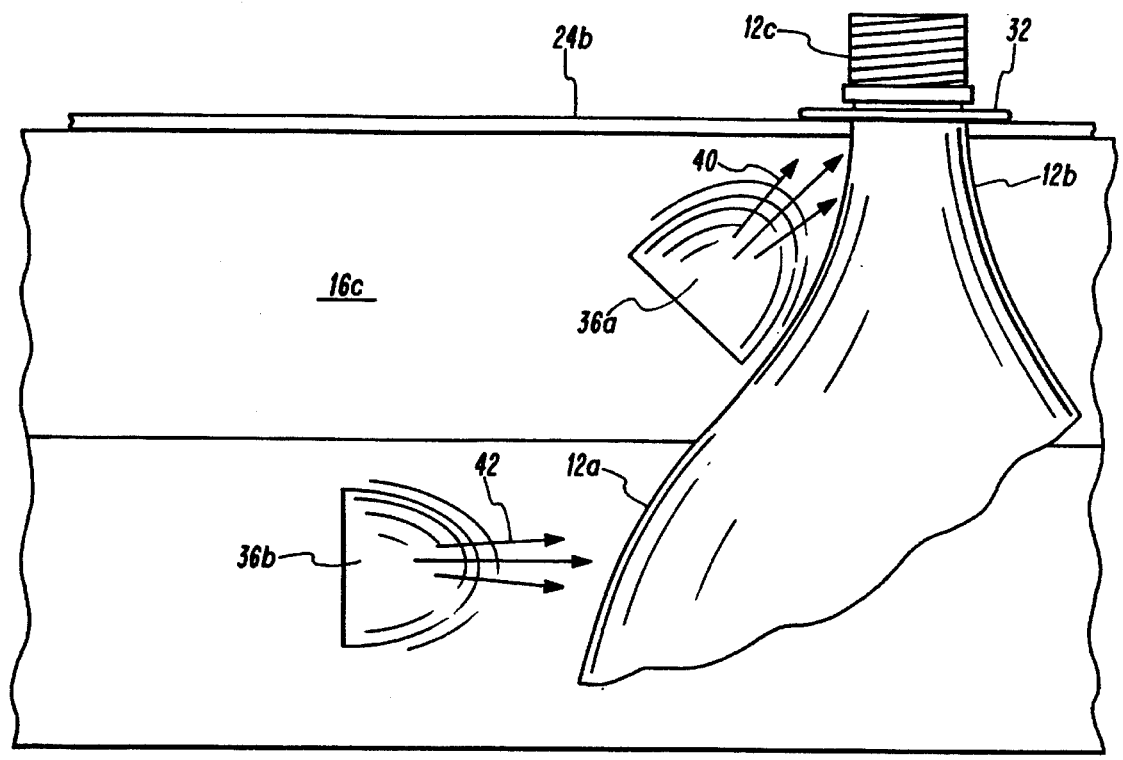
FIG. 3
FIG. 4
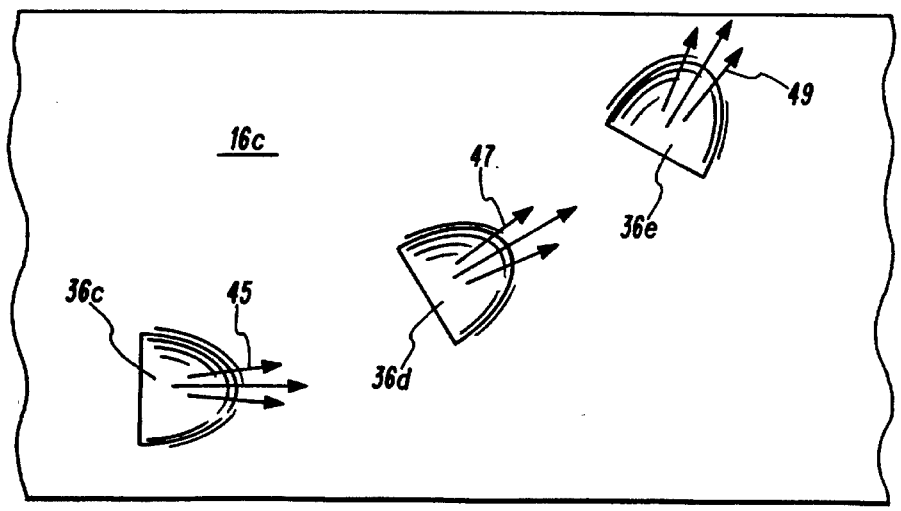

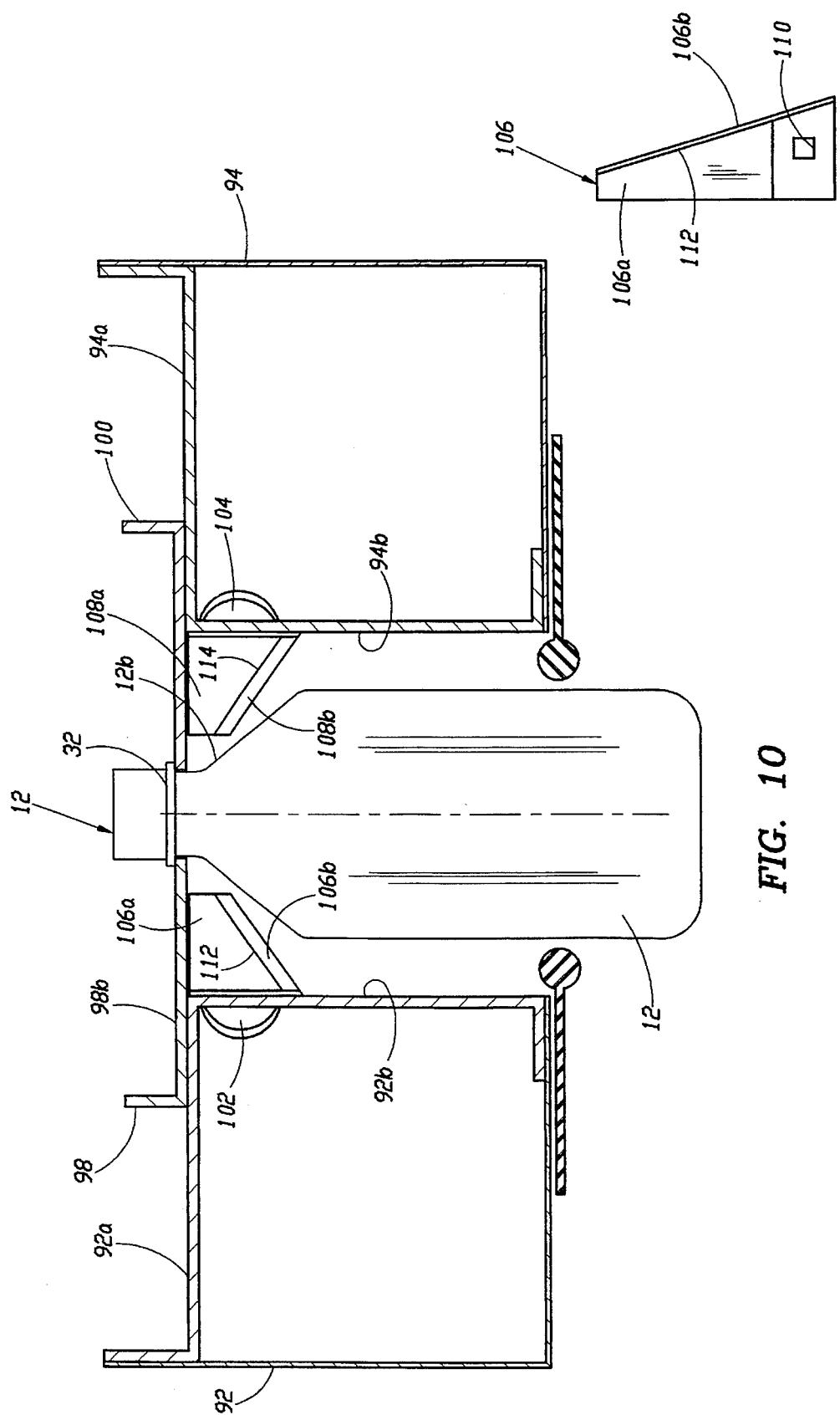

PNEUMATIC CONVEYOR APPARATUS HAVING AIR DEFLECTORS

CROSS-REFERENCE TO RELATED APPLICATION

This application is a continuation-in-part of application Ser. No. 07/999,770, filed Dec. 29, 1992, now U.S. Pat. No. 5,299,899.

FIELD OF INVENTION

This invention relates generally to article conveyors and in particular to improved apparatus for pneumatically conveying articles along a predetermined path.

1. Background of the Invention

Pneumatic apparatus are often used to transport empty articles, such as empty beverage cans and bottles, along a predetermined conveyor path. The articles are propelled by a pneumatic force directed thereon. For example, in a soft drink packaging operation, the individual beverage containers, be they aluminum cans or plastic bottles, may be transported by a force resulting from air flow on the containers prior to the containers being filled.

2. Description of the Prior Art

According to prior practice, pneumatic conveyor apparatus typically includes a plurality of air vents for directing a flow of air to move the articles along the conveyor path. The vents are oriented for blowing air only in the direction in which the articles are transported.

One type of apparatus is adapted for transporting containers having a threaded neck portion and an annular ring in concentric relationship with the neck portion. The apparatus includes spaced apart, parallel neck guides for receiving the neck portion between the guides and for engaging the ring to support the container in a relatively upright position. In this type of apparatus, the air is blown exclusively against the threaded neck portion above the ring of each container, which moves the corresponding container along the guides. Among the disadvantages of this type of apparatus is that the air is not directed against the larger body position of the container below the neck ring, so that the "sail effect" is not utilized. Another disadvantage of this type of apparatus is that friction between the neck ring and the guides impedes the movement of the containers along the guides.

In another type of apparatus, air is blown against the larger body portion of each container, to take advantage of the "sail effect". However, blowing air on the lower body portion of the containers causes the containers to swing in the direction of movement of the containers, thereby "digging" the neck ring into the guides.

Yet another type of apparatus, which is typically used for handling lightweight containers such as empty aluminum cans, employs a relatively flat plenum with a plurality of air vents on an upwardly facing surface of the plenum for directing air on the bottom surface of each container. The air flow directed against the bottom of each container pushes the corresponding container downstream and also provides a slight lifting action on the container. One disadvantage of this type of apparatus is that the air flow through the vents is not constrained, thereby detracting from the pneumatic force which can be brought to bear against the containers. Further, the bottom surface of each container is dragged over the air vents, thereby retarding the movement of the containers because of friction. Because the air vents are on an upwardly facing surface, the vents are susceptible to build-up of dirt and other material thereon, which can clog the vents or otherwise impede air flow therethrough.

There is therefore a need in the art of pneumatic conveyors for improved apparatus for conveying articles, such as beverage cans and bottles.

SUMMARY OF THE INVENTION

In accordance with the present invention, apparatus is provided for pneumatically conveying an article along a predetermined path. The apparatus is comprised of first and second pneumatic means positionable on respective opposite sides of the path for providing a pneumatic flow to move the article along the path; retaining means for retaining the article in a relatively upright position as the article is moved along the path; and deflecting means mounted with at least one of the first and second pneumatic means and extending into the path for deflecting the pneumatic flow toward the article. The pneumatic flow includes a component for lifting the article as the article is moved along the path.

In accordance with one embodiment of the invention, the deflecting means includes at least one deflector mounted with each of the first and second pneumatic means and extending into the path. In another embodiment, each deflector has relatively flat, first and second members. The first member of each deflector is oriented substantially in a vertical plane. The second member of each deflector depends upwardly from the corresponding first member at a predetermined angle of inclination and is coincident therewith along a predetermined boundary which extends generally upwardly and inwardly from the pneumatic means with which the corresponding deflector is mounted. The first and second members of each deflector are cooperable for directing pneumatic flow generally upwardly and inwardly from the corresponding pneumatic means.

In accordance with another feature of the invention, the first pneumatic means includes a first air duct communicating with an air supply and a plurality of first vents in a laterally facing surface of the first air duct for directing a flow of air on the article when the article is retained in the relatively upright position. The second pneumatic means includes a second air duct communicating with an air supply and having a plurality of second vents in a laterally facing surface of the second air duct for directing a flow of air on the article when the article is retained in the relatively upright position. The deflecting means preferably includes a plurality of first deflectors mounted with a laterally facing surface of the first air duct at selected locations therealong and extending into the path at a predetermined angle with respect to the laterally facing surface of the first air duct. The deflecting means preferably further includes a plurality of second deflectors mounted with a laterally facing surface of the second air duct at selected locations therealong and extending into the path at a predetermined angle with respect to the laterally facing surface of the second air duct. Each of the first deflectors is located with respect to one of the second deflectors such that each of the first deflectors is cooperable with one of the second deflectors for deflecting air generally upwardly and inwardly.

In accordance with yet another feature of the invention, the direction of the predetermined path is altered by providing the first pneumatic means with a plurality of first sections joined in end-to-end abutting relationship and the second pneumatic means with a plurality of second sections joined in end-to-end abutting relationship. Abutting ends of adjacent first sections are beveled at a predetermined angle to define a predetermined miter joint between adjacent first sections. The abutting ends of adjacent second sections are beveled at a predetermined angle to define a second miter joint between adjacent second sections. The first sections cooperate with the second sections to define the corresponding change in direction of the predetermined path.

In accordance with still another feature of the invention, the retaining means includes first and second guides having a predetermined gap therebetween. The gap is adapted to receive a neck portion of the article and the first and second guides are adapted to engage a lower surface of a radially enlarged portion of the article, whereby the article is retainable in the relatively upright position. In order to change the direction of the predetermined path, the first guide is defined by alternating first straight and first curved guide sections and the second guide is defined by alternating second straight and second curved guide sections. Each of the first curved guide sections has a predetermined radius of curvature and each of the second guide sections has a predetermined radius of curvature. In the preferred embodiment, the approximate geometric center of each of the first curved guide sections is coincident with a corresponding first miter joint and the approximate geometric center of each of the second curved guide sections is coincident with a corresponding second miter joint.

BRIEF DESCRIPTION OF THE DRAWINGS

FIG. 3 is a partial side elevation view thereof, illustrating the flow of air to lift and transport an article along a predetermined path;

FIG. 4 is a partial side elevation view of an alternate embodiment of the pneumatic conveyor apparatus, according to the present invention, illustrating an alternate arrangement of air vents;

FIG. 10 is an end elevation view of the pneumatic conveyor apparatus of FIG. 9;

FIG. 11 is a detailed view of a deflector component of the pneumatic conveyor apparatus of FIG. 9.

DETAILED DESCRIPTION OF THE PREFERRED EMBODIMENT

Figure 1:
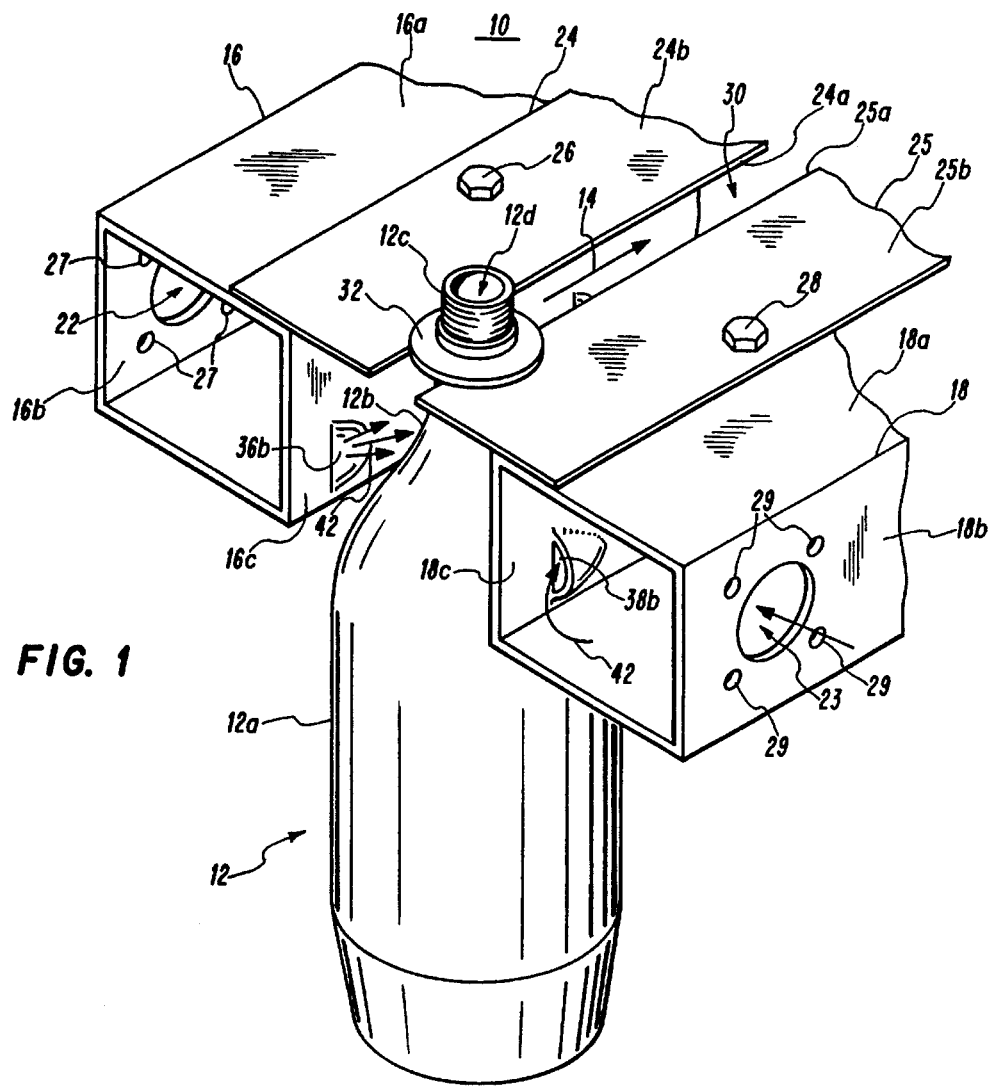
FIG. 1 is a partial perspective view of a pneumatic conveyor apparatus, according to the present invention.

In the description which follows, like parts are marked throughout the specification and drawings with the same respective reference numerals. The drawings are not necessarily to scale and in some instances proportions may have been exaggerated in order to more clearly depict certain features of the invention.

Figure 2:
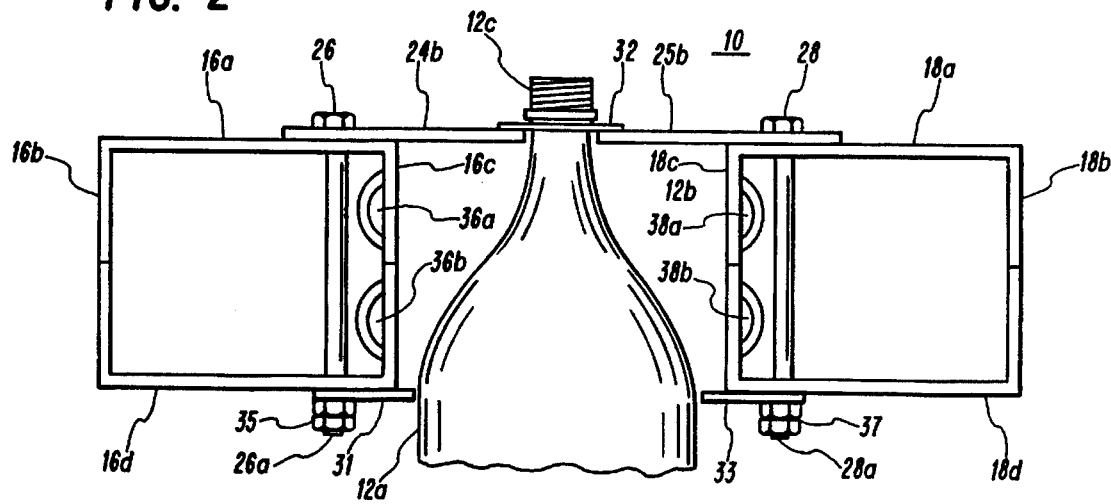
FIG. 2 is an end elevation view thereof.
Figure 5:
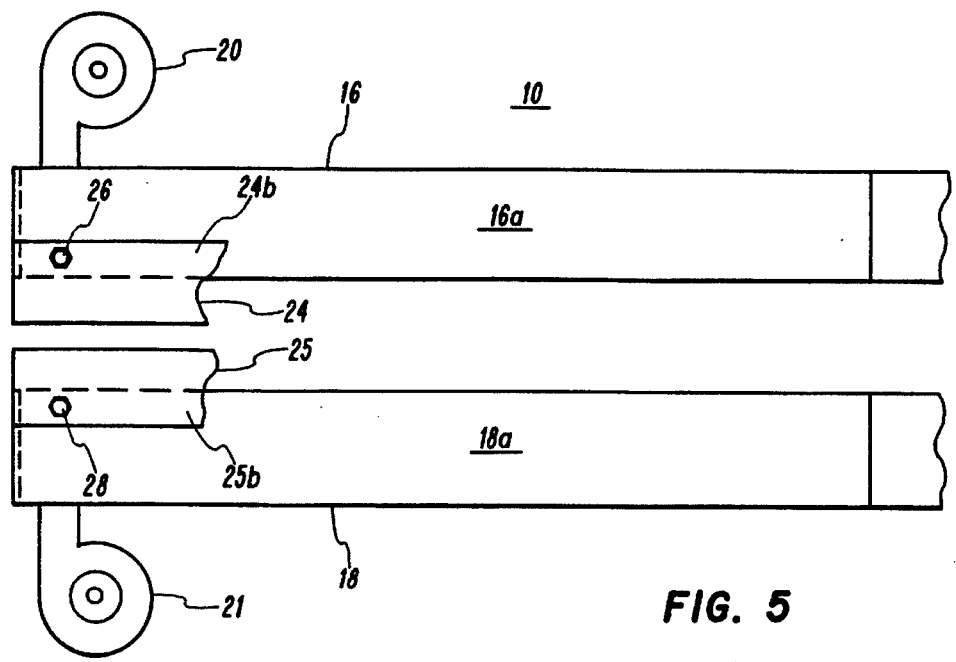
FIG. 5 is a top plan view of the pneumatic conveyor apparatus of FIG. 1.

Referring to FIGS. 1, 2, and 5, an apparatus 10 is provided for pneumatically conveying articles, such as a plastic beverage bottle 12, along a predetermined path, as indicated by arrow 14. Apparatus 10 includes first and second air ducts 16 and 18 extending along respective opposite sides of path 14, blowers 20 and 21 in fluid communication with the interior of ducts 16 and 18 through respective ports 22 and 23 for pressurizing the interior thereof, and a pair of guide plates 24 and 25, which are mounted by means of respective bolts 26 and 28 to respective upwardly facing surfaces 16a and 18a of ducts 16 and 18. Bolts 26 and 28 also mount lower guide flanges 31 and 33 to respective downwardly facing surfaces 16d and 18d of ducts 16 and 18. Nuts 35 and 37 are received on respective threaded ends 26a and 28a of bolts 26 and 28 for securing the respective bolts 26 and 28. Mounting holes 27 are provided for mounting blower 20 on a laterally facing surface 16b of duct 16 and mounting holes 29 are provided for mounting blower 21 on a laterally facing surface 18b of duct 18. Respective inwardly facing edges 24a and 25a, which define respective minor surfaces of guide plates 24 and 25, are in spaced parallel relation to define a gap 30 of predetermined width extending substantially along the entire conveyor path 14.

Bottle 12 is preferably a lightweight plastic bottle adapted for storing beverages, such as soft drinks. Bottle 12 includes a main body portion 12a and a tapered neck portion 12b defining the top portion of bottle 12. An annular ring 32 is in concentric relationship with neck portion 12b below a threaded portion 12c adjacent top opening 12d of bottle 12. Gap 30 is of sufficient width to receive neck portion 12b. Neck portion 12b is insertable into gap 30 from one end of conveyor path 14 in a direction parallel to the direction of movement of bottle 12 along conveyor path 14. The respective relatively flat upwardly facing surfaces 24b and 25b of guide plates 24 and 25 engage a lower surface of ring 32 to support bottle 12 in a relatively upright position as bottle 12 is transported along path 14.

Ducts 16 and 18 are suspended by conventional means, such as by hangers (not shown). Ducts 16 and 18 are preferably made of metal material, such as aluminum or steel, and have substantially rectangular cross sections with closed ends for retaining air pressure therein. As such, ducts 16 and 18 serve as plenums for maintaining a higher pressure within ducts 16 and 18 than on the outside thereof.

Referring also to FIG. 3, selected areas of duct 16 are punched to define a first plurality of air vents 36a, 36b extending through a laterally facing surface 16c of duct 16. Selected ones of duct 18 are punched to define a second plurality of air vents 38a, 38b extending through a laterally facing surface 18c of duct 18. As can be best seen in FIG. 3, the upper vents 36a are configured to direct air in the direction indicated by arrow 40, whereby the air flow includes both a horizontal component for urging bottle 12 along path 14 and a vertical component for lifting bottle 12. Upper vents 36a preferably direct air at an angle of inclination of approximately 45° for directing a flow of air on the undersurface of ring 32, to exert a lifting force on bottle 12. In addition to the lifting component, the air flow through upper vents 36a acting on neck portion 12b beneath ring 32 urges bottle 12 downstream along the conveyor path. The lower vents 36b direct a flow of air substantially horizontally, as indicated by arrows 42, against main body portion 12a for urging bottle 12 along the conveyor path. Although not shown in detail in FIG. 3, vents 38a, 38b also include both inclined and horizontal vents, arranged in the same manner as depicted with respect to vents 36a, 36b in FIG. 3, with the lower vents 38b being horizontal for directing a substantially horizontal air flow on main body portion 12a and the upper vents 38a being configured to direct air at a 45° upward angle of inclination. The lifting force provided by the air flow through the inclined vents 36a and 38a lifts ring 32 slightly above support surfaces 22b and 24b so that ring 32 does not dig into surfaces 22b and 24b as bottle 12 is moved along the conveyor path.

In an alternate embodiment (not shown), the horizontal vents are eliminated so that all of the air vents direct air at a predetermined angle of inclination. The horizontal component of the air flow from the inclined vents propels the bottle downstream and the vertical component lifts the bottle as it is moved downstream.

Referring now to FIG. 4, an alternate embodiment of a vent arrangement is depicted. In the arrangement shown in FIG. 4, air vents 36 include lower, intermediate and upper vents 36c, 36d, and 36e, respectively. Although not shown in FIG. 4, the vents on the opposite side of the conveyor path are arranged in the same manner. Lower vents 36c are oriented horizontally for directing a flow of air substantially in the direction of movement of the bottle (not shown in FIG. 4), as indicated by arrows 45, to urge the bottle downstream. Intermediate vents 36d are configured to direct air at an upward angle of inclination of approximately 30° bottle on both the main body portion and the neck portion, as indicated by arrows 47. The upper vents 36e are inclined at a greater angle of inclination than intermediate vents 36d (e.g. approximately 60°) for directing air on the undersurface of the neck ring and on the neck portion (not shown) of the bottle, as indicated by arrows 49, whereby vents 36c exert the primary lifting force on the bottle.

Figure 6:
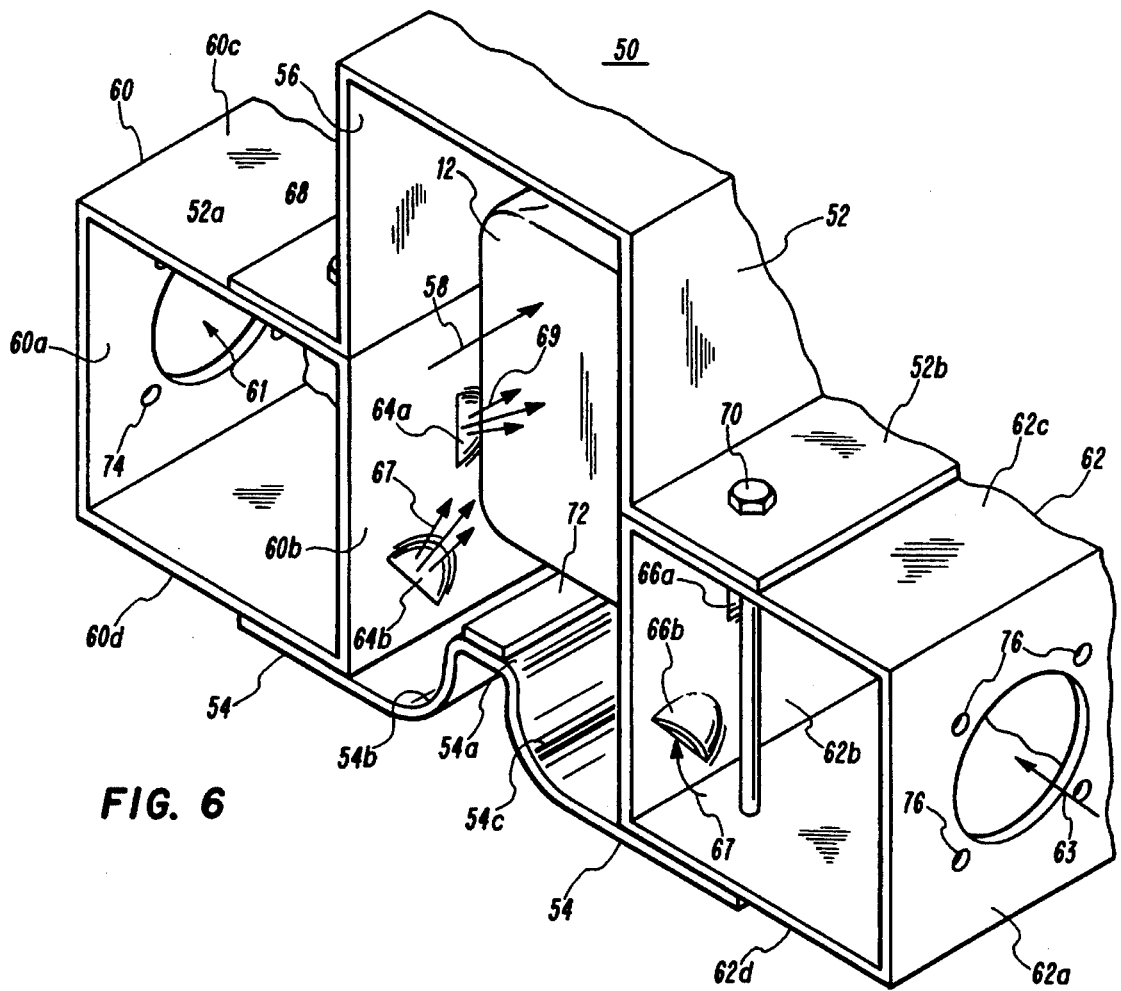
FIG. 6 is a partial perspective view of another alternate embodiment of a pneumatic conveyor apparatus, according to the present invention.
Figure 7:
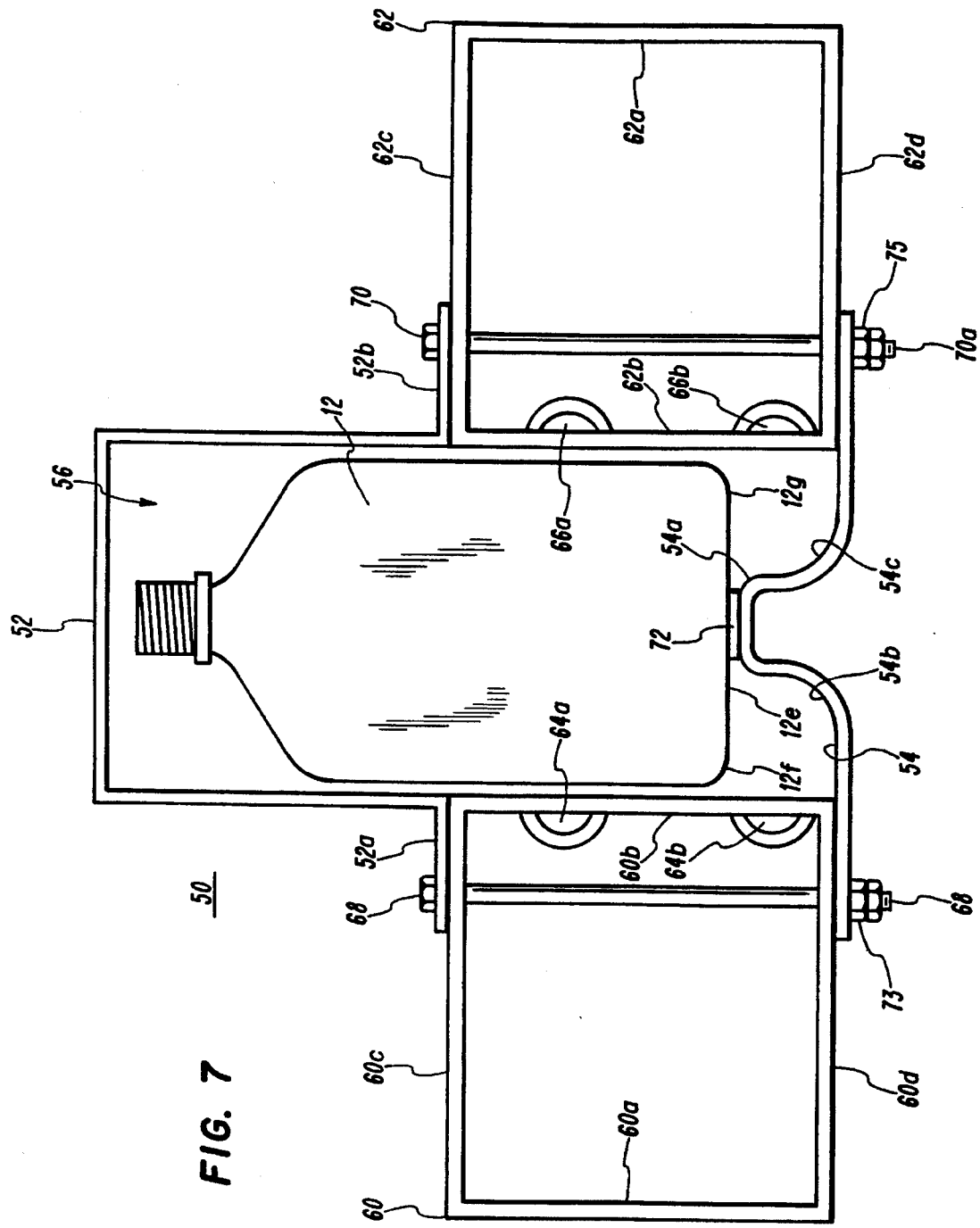
FIG. 7 is an end elevation view of the pneumatic conveyor apparatus of FIG. 6.

Referring now to FIGS. 6 and 7, yet another alternate embodiment of a pneumatic conveyor apparatus 50 is depicted. Apparatus 50 includes a housing 52, which cooperates with a base support member 54 to define a substantially enclosed chamber 56 in which the articles to be conveyed are received. A bottle 12, which is preferably a plastic bottle of the type adapted to store beverages such as soft drinks, is supported on an elevated portion 54a of base support member 54. Bottle 12 is moveable along the predetermined conveyor path indicated by arrow 58 by pneumatic force exerted on bottle 12.

First and second air ducts 60 and 62 extend along respective opposite sides of conveyor path 58. Air ducts 60 and 62 are in fluid communication with an air supply (not shown), such as an air blower (not shown), through respective ports 61 and 63 in respective laterally facing surfaces 60a and 62a. The ends of each air duct 60 and 62 are closed to maintain air pressure within ducts 60 and 62 at a higher pressure than in chamber 56.

Selected areas of duct 60 are punched to define a first plurality of air vents 64a, 64b extending through a laterally facing surface 60b of duct 60. Selected areas of duct 62 are punched to define a second plurality of air vents 66a, 66b extending through a laterally facing surface 62b of duct 62. Vents 64a, 64b and 66a, 66b are configured to direct a flow of air into chamber 56. The pneumatic force acting on bottle 12 propels bottle 12 along conveyor path 58.

As can be best seen in FIG. 6, the lower vents 64b and 66b direct air at an upward angle of inclination of approximately 45°, as indicated by arrows 67. The air flow from lower vents 64b and 66b includes both a horizontal component for urging bottle 12 downstream and a vertical component for lifting bottle 12. The upper vents 64a and 66a direct air substantially horizontally in the direction of movement of bottle 12, as indicated by arrows 69. The lower vents 64b and 66b are positioned at or slightly below a bottom surface 12e of bottle 12, such that the air flow emanating from the lower vents 64b and 66b is directed on the respective opposed corners 12f and 12g of bottle 12, thereby lifting bottle 12 slightly upwardly from elevated portion 54a and imparting a motive force in the direction of movement of bottle 12. In an alternate embodiment (not shown) all of the vents are oriented substantially horizontally -for directing a substantially horizontal flow of air against bottle 12. Concave surfaces 54b and 54c of support member 54 are adapted to direct air upwardly against bottom surface 12e on each side of elevated portion 54a, thereby exerting a lifting force on bottle 12. Mounting holes 74 are provided for mounting an air blower (not shown) with surface 60a. Mounting holes 76 are provided for mounting an air blower (not shown) with surface 62a. In another alternate embodiment (not shown), all of the vents are oriented at respective predetermined angles of inclination for directing a flow of air having a vertical component and a horizontal component against bottle 12.

The upper vents 64a and 66a direct a flow of air on main body portion 12a to provide a motive force for propelling bottle 12 along the conveyor path 58. The substantially enclosed chamber 56 traps air pressure within housing 52, thereby enhancing the effect of the air flow directed into chamber 56 by vents 64a, 64b and 66a, 66b. As can be best seen in FIG. 6, housing 52 includes laterally extending flanges 52a and 52b coupled to upwardly facing surfaces 60c and 62c of ducts 60 and 62 by means of respective bolts 68 and 70. Bolts 68 and 70 also attach support member 54 to respective downwardly facing major surfaces 60d and 62d of ducts 60 and 62. Nuts 73 and 75 are received on respective threaded ends 68a and 70a of bolts 68 and 70 to secure bolts 68 and 70. Elevated portion 54a includes a strip of material 72 having a relatively low coefficient of friction for contacting bottom surface 12e to facilitate movement of bottle 12 along elevated portion 54a. One type of material which is suitable for such use is a plastic material manufactured and sold under the trademark TEFLON® by du Pont de Nemours.

Figure 8:
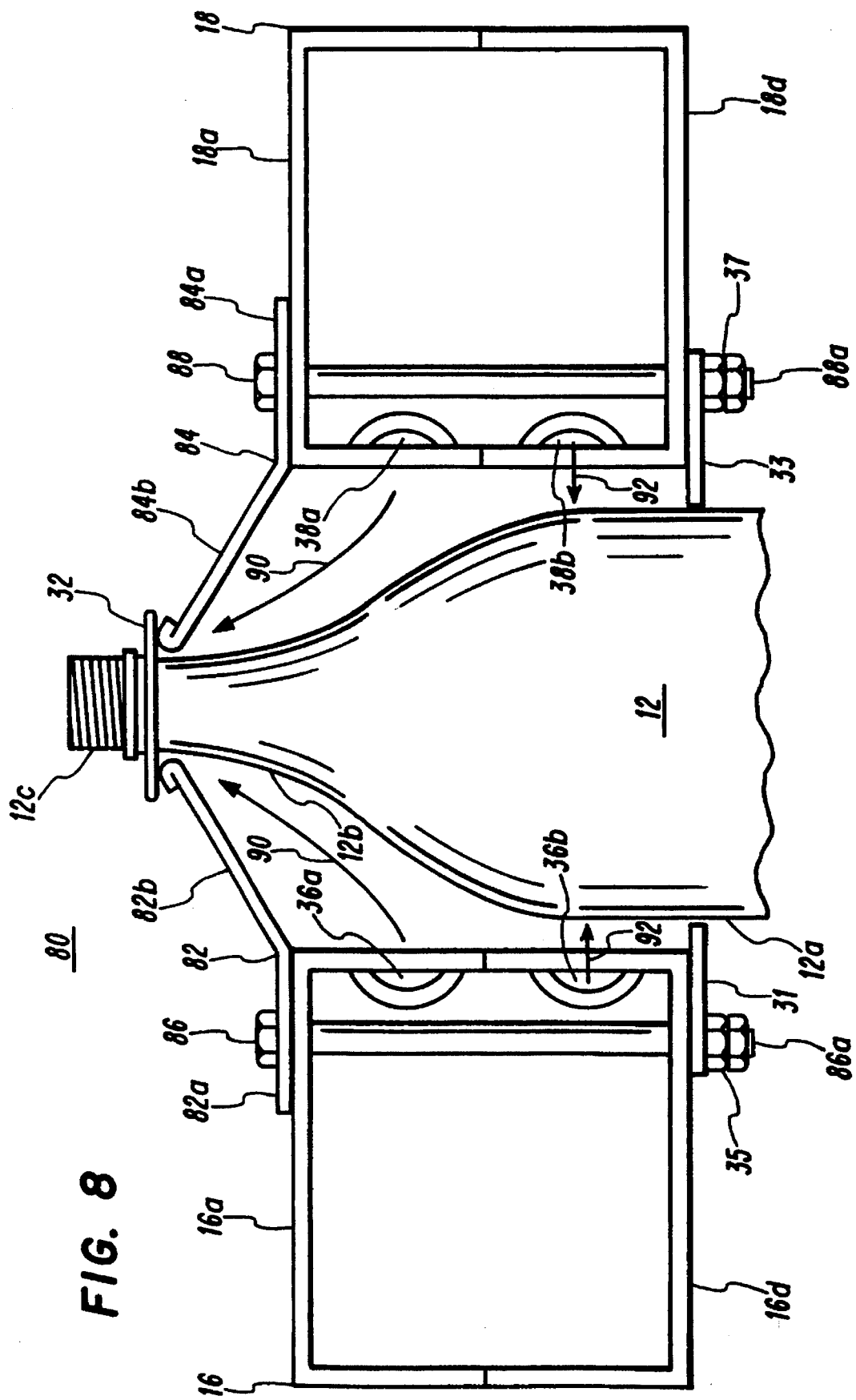
FIG. 8 is an end elevation view of yet another alternate embodiment of a pneumatic conveyor apparatus, according to the present invention.

Referring now to FIG. 8, still another alternate embodiment of a pneumatic conveyor apparatus 80 is depicted. Apparatus 80 is similar to apparatus 10, described hereinabove with reference to FIGS. 1–3 and 5, except that apparatus 80 includes a pair of guides 82 and 84, which are mounted by means of respective bolts 86 and 88 to respective upwardly facing surfaces 16a and 18a of ducts 16 and 18. Bolts 86 and 88 also mount lower guide flanges 31 and 33 to respective downwardly facing surfaces 16d and 18d of ducts 16 and 18. Nuts 35 and 37 are received on respective threaded ends 86a and 88a of bolts 86 and 88 for securing the respective bolts 86 and 88.

Guides 82 and 84 have respective first portions 82a and 82b, which are bolted in facing relationship with respective upwardly facing surfaces 16a and 18a, and respective second portions 82b and 84b. Second portions 82b and 84b depend inwardly and upwardly from respective first portions 82a and 84a, such that second portions 82b and 84b are oriented at respective angles of inclination with respect to the horizontal upwardly facing surfaces 16a and 18a. Respective distal ends of second portions 82b and 84b engage the lower surface of neck ring 32 for lifting bottle 12 so that neck ring 32 is elevated above upwardly facing surfaces 16a and 18a.

The air flow emanating through inclined vents 36a and 38a is directed upwardly by respective lower surfaces of second portions 82b and 84b against a lower surface of neck ring 32 and against neck portion 12b, to enhance the lifting force on bottle 12. Arrows 90 represent the upward air flow directed against the lower surface of ring 32 and against neck portion 12b. Arrows 92 represent the substantially lateral air flow emanating from the non-inclined vents 36b and 38b.

Figure 9:
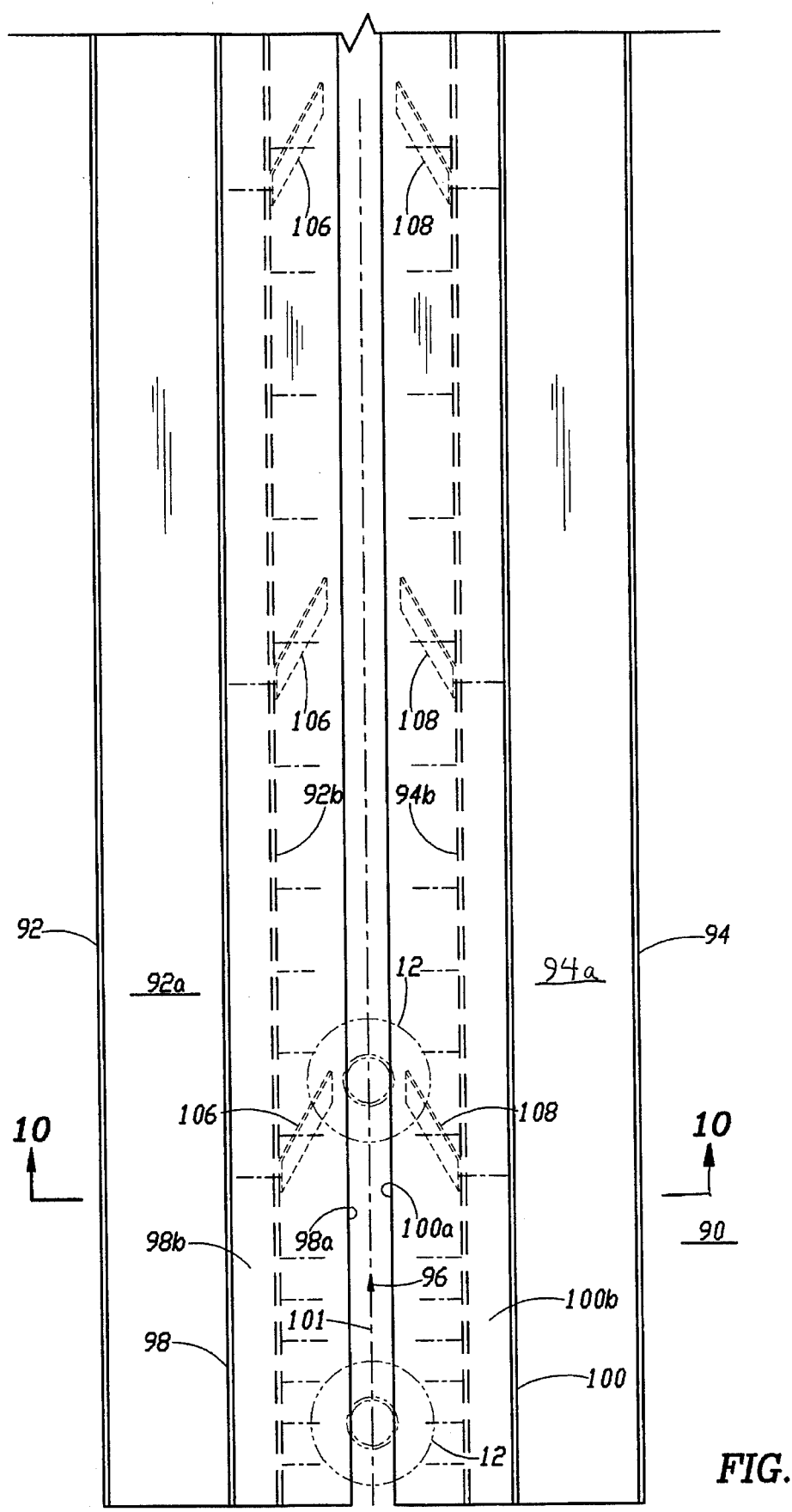
FIG. 9 is a top plan view of still another alternate embodiment of a pneumatic conveyor apparatus.

Referring now to FIGS. 9–11, still another alternate embodiment of a pneumatic conveyor apparatus according to the present invention is depicted. Apparatus 90 includes first and second air ducts 92 and 94 extending along respective opposite sides of a predetermined conveyor path, as indicated by arrow 96. A blower (not shown) is in fluid communication with the interior of each duct 92 and 94, for pressurizing the interior thereof. A pair of guide plates 98 and 100 are mounted with respective upwardly facing surfaces 92a and 94a of ducts 92 and 94. Respective inwardly facing edges 98a and 100a of guide plates 98 and 100 are in spaced parallel relation to define a gap 101 of predetermined width extending substantially along the entire conveyor path 96.

Guide plates 98 and 100 have respective relatively flat upwardly facing surfaces 98b and 100b for engaging a lower surface of ring 32 of bottle 12, to support bottle 12 in a relatively upright position as bottle 12 is transported along path 96, as can be best seen in FIG. 10.

Lateral surface 92b of duct 92 has a first plurality of air vents 102, which are formed by punching lateral surface 92b at selected intervals therealong. Each vent 102 is located proximate to the intersection of lateral surface 92b and upwardly facing surface 92a. Lateral surface 94b of duct 94 has a second plurality of air vents 104, which are formed by punching lateral surface 94b at selected locations therealong. Each vent 104 is located proximate to the intersection of lateral surface 94b and upwardly facing surface 94a. Vents 102 and 104 are configured to direct air upwardly at a predetermined angle of inclination (e.g., 45°), as previously described with respect to vents 36a and 38a shown in FIG. 3.

In accordance with one feature of the invention, a first plurality of deflectors 106 are mounted with lateral surface 92b, at selected locations therealong, and a second plurality of deflectors 108 are mounted with lateral surface 94b, at selected locations therealong. Deflectors 106 and 108 extend from respective lateral surfaces 92b and 94b into conveyor path 96. Each deflector 106, 108 is oriented at a predetermined angle (e.g., 45°) with respect to the corresponding lateral surface 92b, 94b, as can be best seen in FIG. 9. Each deflector 106 is in opposed relationship with one of the deflectors 108, such that deflectors 106 and 108 are arranged in cooperating pairs (each pair comprising one deflector 106 and one deflector 108) at predetermined intervals along conveyor path 96. Each pair of deflectors 106 and 108 cooperates to direct air flow upwardly and inwardly toward neck portion 12b of each bottle 12, thereby enhancing the pneumatic force urging bottles 12 downstream. Deflectors 106 and 108 are spaced along conveyor path 96 to break up laminar air flow, thereby increasing the turbulence of the air flow, which also enhances the pneumatic force brought to bear on articles 12.

Each deflector 106, 108 is mounted with the corresponding lateral surface 92b, 94b by means of a square shank mounting bolt 110. The location of each bolt 110 is indicated by a broken line extending outwardly from the corresponding surface 92b, 94b, as can be best seen in FIG. 9. Each deflector 106 includes relatively flat first and second members 106a and 106b and each deflector 108 includes relatively flat first and second members 108a and 108b. First members 106a and 108a are generally trapezoidal and are tapered such that first members 106a and 108a are narrowest at their respective distal ends. Second members 106b and 108b are chamfered at their respective distal ends. Each first member 106a is oriented in a substantially vertical plane. Each second member 106b depends upwardly from the corresponding first member 106a at a predetermined angle of inclination (e.g., 45°) and is coincident therewith along a boundary 112, which extends generally upwardly and inwardly from lateral surface 92b. Similarly, each first member 108a is oriented in a substantially vertical plane. Each second member 108b depends upwardly from the corresponding first member 108a at a predetermined angle of inclination (e.g., 45°) and is coincident therewith along a boundary 114, which extends generally upwardly and inwardly from lateral surface 94b. First and second members 106a and 106b of each deflector 106 cooperate to deflect air flow upwardly and inwardly on one side of path 96 and first and second members 108a and 108b cooperate to deflect air flow upwardly and inwardly on an opposite side of path 96, thereby substantially enhancing the pneumatic force brought directed against neck portion 12b of a bottle 12.

Each deflector 106 is located in proximity to one of the air vents 102, just upstream of the corresponding vent 102, such that air emanating from the corresponding air vent 102 is deflected inwardly by the outwardly facing surface of the corresponding first member 106a. By the same token, each deflector 108 is located in proximity to one of the air vents 104, just upstream of the corresponding vent 104, such that air emanating from the corresponding air vent 104 is deflected inwardly by the outwardly facing surfaces of the corresponding first member 108a. The respective locations of air vents 102 and 104 are indicated by the broken lines extending inwardly from the respective laterally facing surfaces 92b and 94b, as can be best seen in FIG. 9.

The upstream air flow is deflected upwardly and inwardly by first and second members 106a and 106b of each deflector 106 and by first and second members 108a and 108b of each deflector 108, thereby further enhancing the pneumatic force brought to bear against neck portion 12b of a bottle 12.

In operation, as can be best seen in FIG. 9, each bottle 12 is propelled between cooperating pairs of deflectors 106 and 108, which are located in opposed relationship at selected positions along path 96. The upstream air flow is directed inwardly by the inwardly facing surface of each first member 106a, 108a and upwardly by each second member 106b, 108b. As each bottle 12 is urged downstream beyond the respective distal edges of the deflectors 106 and 108 of each cooperating pair, the air flow emanating from the respective air vents 102 and 104 in proximity to the corresponding deflectors 106 and 108 is directed inwardly against neck portion 12b of the corresponding bottle 12 by the outwardly facing surfaces of the corresponding first members 106a and 108a, thereby further enhancing the pneumatic force urging the corresponding bottle 12 downstream.

Figure 12:
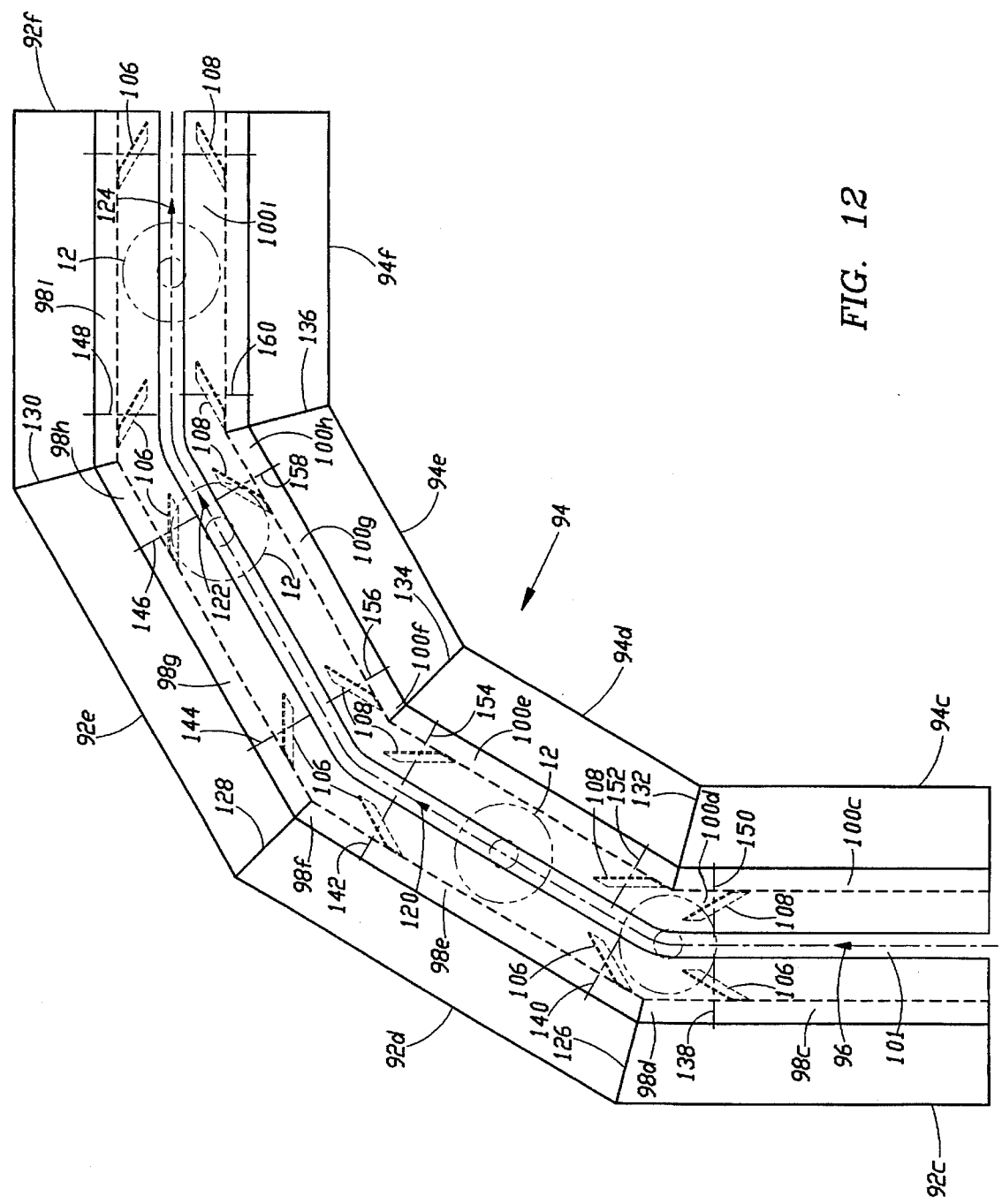
FIG. 12 as a top plan view of yet another alternate embodiment of a pneumatic conveyor apparatus, according to the present invention.

Referring to FIG. 12, the path along which bottles 12 are conveyed changes directions by approximately 90°, as indicated by arrows 96, 120, 122 and 124. A portion of the conveyor path represented by arrow 96 represents a continuation of the relatively straight conveyor path depicted in FIG. 9. Arrows 120 and 122 represent transition regions in which the direction of bottles 12 is changed to a new direction, as indicated by arrow 124 (e.g., approximately 90° offset with respect to the original direction, as represented by arrow 96).

In order to change the direction of flow of bottles 12, the orientation of first and second air ducts 92 and 94 and the orientation of guide plates 98 and 100 are changed accordingly. First air duct 92 is comprised of four distinct sections 92c, 92d, 92e, and 92f. Second air duct 94 is comprised of four distinct sections 94c, 94d, 94e, and 94f. Guide plate 98 is comprised of seven distinct sections 98c, 98d, 98e, 98f, 98g, 98h, and 98i. Guide plate 100 is also comprised of seven distinct sections 100c, 100d, 100e, 100f, 100g, 100h and 100i.

Sections 92c and 94c are miter cut at their respective downstream ends at an angle of approximately 30°; sections 92d and 94d are miter cut at both their upstream and downstream ends at an angle of approximately 30°; sections 92e and 94e are miter cut at their respective upstream and downstream ends at an angle of approximately 30°; and sections 92f and 94f are miter cut at their respective upstream ends at an angle of approximately 30°. The downstream end of section 92c is positioned in abutment with the upstream end of section 92d to define a miter joint 126; the downstream end of section 92d is positioned in abutment with the upstream end of section 92e to define a miter joint 128; and the downstream end of section 92e is positioned in abutment with the upstream end of section 92f to define a miter joint 130. Similarly, the downstream end of section 94c is positioned in abutment with the upstream end of section 94d to define a miter joint 132; the downstream end of section 94d is positioned in abutment with the upstream end of section 94e to define a miter joint 134; and the downstream end of section 92e is positioned in abutment with the upstream end of section 92f to define a miter joint 136.

Guide plate sections 98c, 98e, 98g, and 98i are straight sections, while guide plate sections 98d, 98f, and 98h are curved sections. Similarly, guide plate sections 100c, 100e, 100g, and 100i are straight sections, while guide plate sections 100d, 100f, and 100h are curved sections. Each guide plate 98, 100 is comprised of alternating straight and curved guide plate sections.

Each curved guide plate section 98d, 98f, 98h has a predetermined radius of curvature and is positioned such that the approximate geometric center is coincident with a corresponding miter joint 126, 128, 130. Each curved guide plate section 100d, 100f, 100h has a predetermined radius of curvature and is positioned such that the approximate geometric center thereof is coincident with a corresponding miter joint 132, 134, 136. The upstream end of each curved guide plate section is located just upstream of a corresponding deflector 106, 108 and the downstream end of each curve guide plate section is located just downstream of the next successive deflector 106, 108. For example, curved guide plate section 98d begins just upstream of a deflector 106 and extends just downstream of the next successive deflector 106. Similarly, curve guide plate section 100d begins just upstream of one of the deflectors 108 and ends just downstream of the next successive deflector 108.

The downstream end of section 98c is joined to the upstream end of section 98d to define an abutment joint 138 therebetween; the downstream end of section 98d is joined to the upstream end of section 98e to define an abutment joint 140 therebetween; the downstream end of section 98e is joined to the upstream end of section 98f to define an abutment joint 142 therebetween; the downstream end of section 98f is joined to the upstream end of section 98g to define an abutment joint 144 therebetween; the downstream end of section 98g is joined to the upstream end of section 98h to define an abutment joint 146 therebetween; and the downstream end of section 98h is joined to the upstream end of section 98i to define an abutment joint 148 therebetween. The downstream end of section 100c is joined to the upstream end of section 100d to define an abutment joint 150 therebetween. The downstream end of section 100d is joined to the upstream end of section 100e to define an abutment joint 152 therebetween; the downstream end of section 100e is joined to the upstream end of section 100f to define an abutment joint 154 therebetween; the downstream end of section 100f is joined to the upstream end of section 100g to define an abutment joint 156 therebetween; the downstream end of section 100g is joined to the upstream end of section 100h to define an abutment joint 158 therebetween; and the downstream end of section 100h is joined to the upstream end of section 100i to define an abutment joined 160 therebetween.

Miter cutting first and second air ducts 92 and 94 to define a plurality of air duct sections and joining the respective sections allows the direction of movement of bottles 12 to be changed as desired. In the example shown in FIG. 12, four distinct air ducts sections are used to change the direction of movement of bottles 12 by approximately 90°. If the direction were to be changed by more than 90°, additional miter cut sections would be added. Similarly, if the direction of movement were to be changed by less than 90°, fewer than four miter cut sections would be used. Providing a plurality of miter cut air duct sections in an arrangement or alternating straight and curved guide plate sections substantially simplifies and reduces the cost of manufacturing the pneumatic conveyor apparatus, as compared to prior art pneumatic conveyor apparatus in which continuously curved air ducts and guide plates are used to effect the change in direction. Further, bottles 12 are less likely to get "hung up" or their movement otherwise impeded because bottles 12 do not have to traverse a continuously curved path.

In accordance with the present invention, improved apparatus for pneumatically conveying articles along a predetermined path is provided. The apparatus is equipped with a plurality of air vents for directing a flow of air on the articles to be conveyed, which includes both a horizontal component for propelling the articles along a predetermined path and a vertical component for exerting a lifting force on the articles as the articles are transported along the path. The lifting force not only reduces the frictional forces tending to impede movement of the articles along the path, but also stabilizes the article in a relatively upright position as the articles are transported. The pneumatic conveyor system according to present invention is well-suited for pneumatically conveying empty containers, such as plastic beverage bottles, before the containers are filled at the packing site.

Various embodiments of the invention has now been described in detail. Since it is obvious that many changes in and additions to the above-described embodiments may be made without departing from the nature, spirit, and scope of the invention, the invention is not to be limited to the disclosed details, except as set forth in the appended claims.

What is claimed is:

1. Apparatus for pneumatically conveying an article along a predetermined path, said apparatus comprising:

first and second pneumatic means positionable on respective opposite sides of the predetermined path for providing a pneumatic flow to move the article along the predetermined path, said pneumatic flow including a component for lifting the article as the article is moved along the predetermined path;

retaining means for retaining the article in a relatively upright position as the article is moved along the predetermined path; and deflecting means mounted with at least one of said first and second pneumatic means and extending into said predetermined path for deflecting the pneumatic flow toward the article, said deflecting means including at least one deflector mounted with each of said first and second pneumatic means and extending into said predetermined path, each deflector having relatively flat first and second members, the first member of each deflector being oriented substantially in a vertical plane, the second member of each deflector depending upwardly from the corresponding first member at a predetermined angle of inclination and being coincident therewith along a predetermined boundary which extends generally upwardly and inwardly from the pneumatic means with which the corresponding deflector is mounted, the first and second members of each deflector being cooperable to direct pneumatic flow generally upwardly and inwardly from the corresponding pneumatic means.

2. Apparatus of claim 1 wherein said deflecting means includes a plurality of first deflectors mounted with said first pneumatic means at selected locations therealong and a plurality of second deflectors mounted with said second pneumatic means at selected locations therealong.

3. Apparatus of claim 1 wherein the first member of each deflector is tapered toward its distal end such that each first member is narrowest at its distal end.

4. Apparatus of claim 1 wherein each second member is chamfered at its distal end.

5. Apparatus for pneumatically conveying an article along a predetermined path, said apparatus comprising:

first and second pneumatic means positionable on respective opposite sides of the predetermined path for providing a pneumatic flow to move the article along the predetermined path, said pneumatic flow including a component for lifting the article as the article is moved along the predetermined path, said first pneumatic means comprising a first air duct communicating with an air supply, said first air duct having a first laterally facing surface and a plurality of first vents in said first laterally facing surface for directing a flow of air on the article when the article is in a relatively upright position, said second pneumatic means comprising a second air duct communicating with an air supply, said second air duct having a second laterally facing surface and a plurality of second vents in said second laterally facing surface for directing a flow of air on the article when the article is in the relatively upright position;

retaining means for retaining the article in the relatively upright position as the article is moved along the predetermined path; and deflecting means mounted with at least one of said first and second pneumatic means and extending into said predetermined path for deflecting the pneumatic flow toward the article, said deflecting means comprising a plurality of first deflectors and a plurality of second deflectors, said first deflectors being mounted with said first laterally facing surface at selected locations therealong and extending into said predetermined path at a predetermined angle with respect to said first laterally facing surface, said second deflectors being mounted with said second laterally facing surface at selected locations therealong and extending into said predetermined path at a predetermined angle with respect to said second laterally facing surface, each of said first deflectors being located with respect to one of said second deflectors such that each of said first deflectors is cooperable with one of said second deflectors to deflect air generally upwardly and inwardly.

6. Apparatus of claim 5 wherein said plurality of first and second vents are configured to direct air flow at a respective predetermined angle of inclination, whereby air directed by each of said first and second vents includes a horizontal flow component for urging the article along the predetermined path and a vertical flow component for lifting the article.

7. Apparatus of claim 5 wherein said first laterally facing surface is in facing relationship with said second laterally facing surface on an opposite side of the predetermined path from said first laterally facing surface.

8. Apparatus of claim 5 wherein each of said first deflectors is mounted with said first air duct in proximity to one of said first vents and just upstream thereof, each of said second deflectors being mounted with said second air duct in proximity to one of said second vents and just upstream thereof.

* * * * *